United States Patent
Sim et al.

(10) Patent No.: US 7,934,695 B2
(45) Date of Patent: May 3, 2011

(54) REFRIGERATOR

(75) Inventors: Jae Seng Sim, Changwon-si (KR); Sung Hee Kang, Changwon-si (KR); Jong Min Shin, Changwon-si (KR); Su Won Lee, Changwon-si (KR); Deok-Hyun Youn, Changwon-si (KR); Dong Seok Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 222 days.

(21) Appl. No.: 11/779,735

(22) Filed: Jul. 18, 2007

(65) Prior Publication Data

US 2008/0016891 A1 Jan. 24, 2008

(30) Foreign Application Priority Data

Jul. 19, 2006 (KR) .................. 10-2006-0067640

(51) Int. Cl.
*F16K 31/02* (2006.01)

(52) U.S. Cl. ................................. 251/129.12

(58) Field of Classification Search .............. 62/498, 62/199, 200; 123/457; 137/1, 271
See application file for complete search history.

(56) References Cited

U.S. PATENT DOCUMENTS

| | | | |
|---|---|---|---|
| 6,230,743 B1 * | 5/2001 | Sugita et al. | 137/625.43 |
| 6,591,619 B2 * | 7/2003 | Kaneko et al. | 62/117 |
| 6,820,634 B2 * | 11/2004 | Reichert et al. | 137/271 |
| 2005/0155657 A1 * | 7/2005 | Kach et al. | 137/859 |
| 2005/0167626 A1 * | 8/2005 | Park | 251/129.12 |

FOREIGN PATENT DOCUMENTS

| | | |
|---|---|---|
| JP | 2004-125095 A | 4/2004 |
| JP | 2005-69645 A | 3/2005 |
| JP | 2006-90418 A | 4/2006 |
| KR | 10-2005-0105337 A | 11/2005 |

* cited by examiner

*Primary Examiner* — Frantz F Jules
*Assistant Examiner* — Emmanuel Duke
(74) *Attorney, Agent, or Firm* — Birch, Stewart, Kolasch & Birch, LLP (57) ABSTRACT

A refrigerator includes a valve assembly located at a refrigerant path from a condenser to at least one expansion valve for controlling flow of a refrigerant from the condenser to the at least one expansion valve. The valve assembly includes a valve chamber, wherein the refrigerant drawn from the condenser is held in the valve chamber; at least one outlet hole through which the refrigerant held in the valve chamber is discharged to a corresponding outlet path connected to the at least one expansion valve; and a valve body for selectively opening and closing the at least one outlet hole as the valve body rotates, such that the refrigerant held in the valve chamber is selectively discharged to the corresponding outlet path.

20 Claims, 10 Drawing Sheets

FIG.1

(Related Art)

FIG.2

(Prior Art)

REFRIGERATOR

CROSS REFERENCE TO RELATED APPLICATIONS

This Nonprovisional application claims priority under 35 U.S.C. §119(a) on patent application Ser. No. 10-2006-0067640 filed in Korea on Jul. 19, 2006, the entire contents of which are hereby incorporated by reference.

BACKGROUND OF THE INVENTION

1. Field of the Invention

The present invention relates to a refrigerator. More particularly, the present invention relates to a refrigerator including a valve assembly that opens and closes a path connected between a condenser and an expansion valve based on an operational state of a compressor to control flow of refrigerant.

2. Discussion of the Related Art

Figure 1:
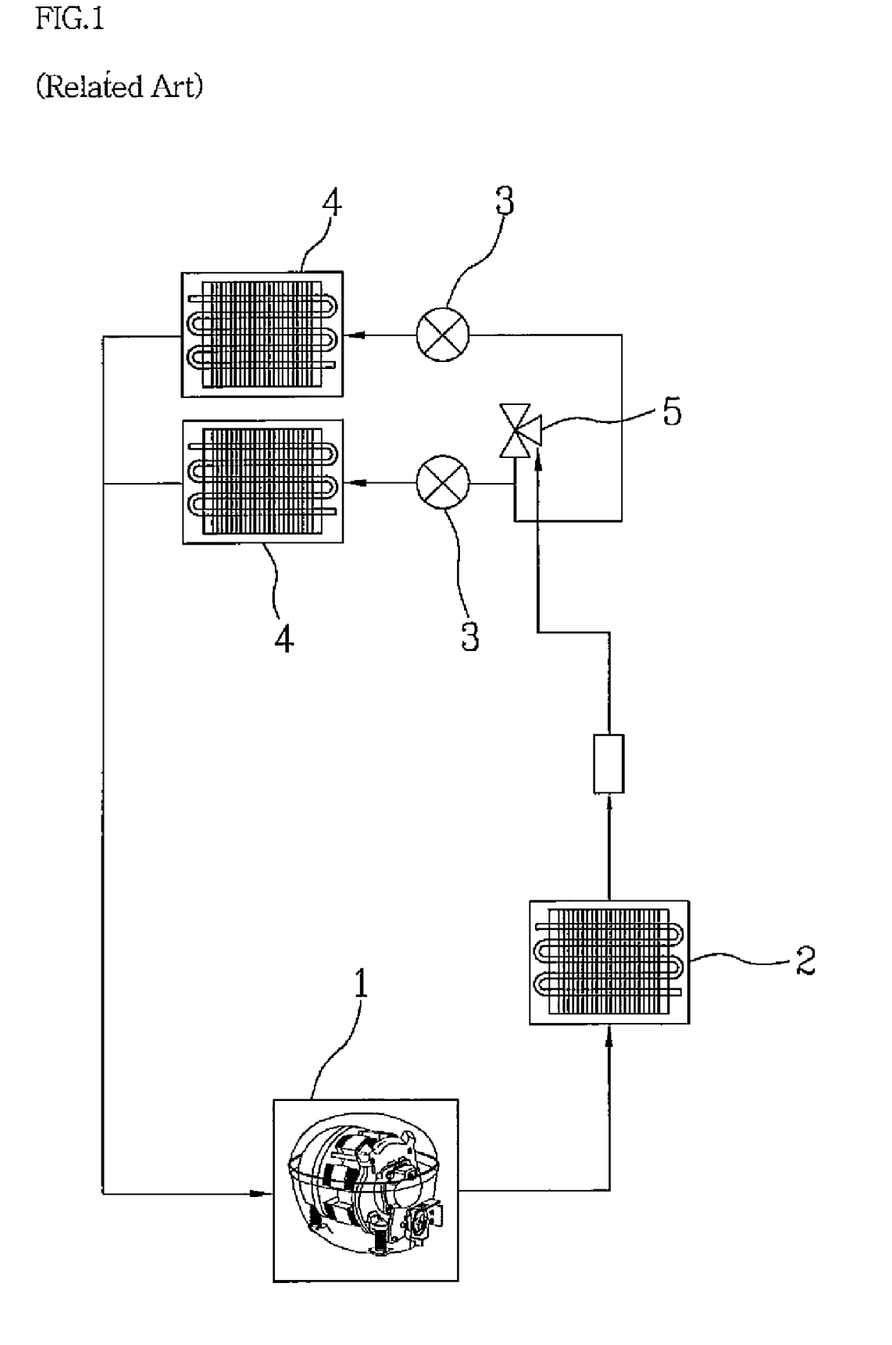
FIG. 1 is a diagram schematically illustrating parts configured of a freezing cycle according to a conventional refrigerator.
Figure 2:
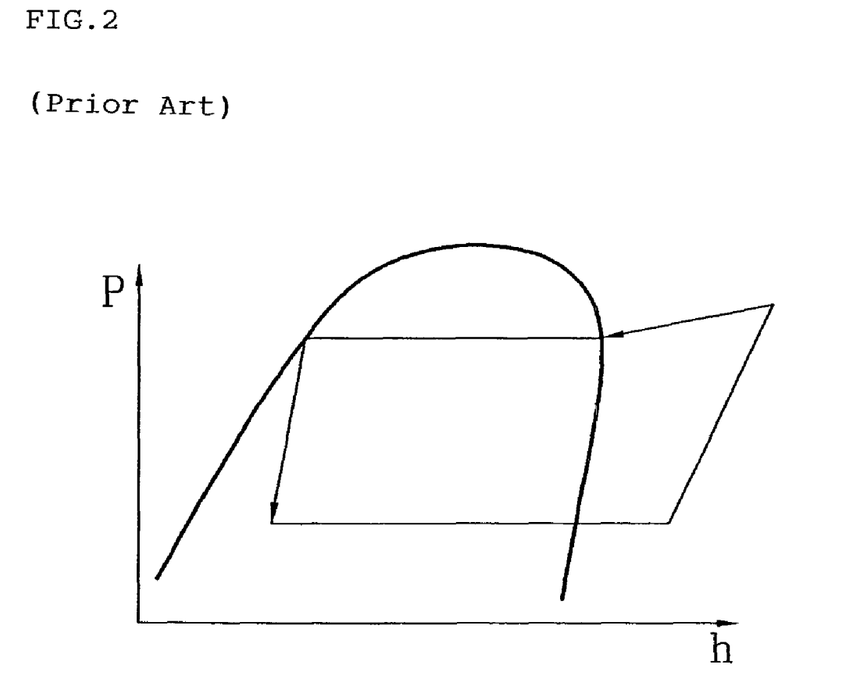
FIG. 2 is a diagram schematically illustrating the freezing cycle of the conventional refrigerator.

FIG. 1 is a diagram schematically illustrating parts configured of a freezing cycle formed in a conventional refrigerator. FIG. 2 is a diagram schematically illustrating the freezing cycle of the conventional refrigerator.

In reference to FIGS. 1 and 2, a conventional refrigerator forms a freezing cycle and the conventional refrigerator includes a compressor 1, a condenser 2, an expansion valve 3, an evaporator 4 and a path through which the refrigerant flows to connect the other parts. The compressor 1 compresses the refrigerant gas in a predetermined pressure. The condenser 2 condenses the refrigerant gas to become a high pressure liquid. The liquidated refrigerant flows to a valve 5 through a drier, and a flow path of the refrigerant is branched. Each branched flow path of the refrigerant is adiabatic-expanded through the expansion valve 3 to be low pressure liquid refrigerant. Each refrigerant is heat-exchanged with the high temperature air inside the refrigerator at each evaporator 4 and is evaporated to cool the air inside the refrigerator. Hence, the evaporated low pressure refrigerant gas is collected in the compressor 1 again.

The compressor 1 is alternately operated and stopped to control the temperature inside the refrigerator. Specifically, while the compressor 1 is operated, the valve 5 is opened to supply the refrigerant to the expansion valve 3 and the evaporator 4, such that the refrigerant is circulated. From the time at which the compressor 1 is stopped to the time at which the compressor 1 is re-operated, the valve 5 is closed to stop flow of a refrigerant cycle. As a result, the efficiency of the refrigerant cycle is enhanced.

However, the conventional refrigerator fails to stop the flow of refrigerant completely because of a structural defect of the valve 5, even when the valve 5 is closed. As a result, even from the time at which the compressor 1 is stopped to the time at which the compressor 1 is re-operated, the refrigerant at the condenser happens to flow into the evaporator, thereby deteriorating the overall efficiency of refrigerant cycle.

SUMMARY OF THE INVENTION

An object of the present invention is to provide a refrigerator that includes a valve assembly for closing an outlet hole of refrigerant airtight to prevent refrigerant leakage.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a refrigerator includes a valve assembly located at a refrigerant path from a condenser to at least one expansion valve for controlling flow of a refrigerant from the condenser to the at least one expansion valve. The valve assembly includes a valve chamber, wherein the refrigerant drawn from the condenser is held in the valve chamber; at least one outlet hole through which the refrigerant held in the valve chamber is discharged to a corresponding outlet path connected to the at least one expansion valve; and a valve body for selectively opening and closing the at least one outlet hole as the valve body rotates, such that the refrigerant held in the valve chamber is selectively discharged to the corresponding outlet path.

In another aspect, as embodied, a refrigerator includes a plurality of expansion valves and evaporators; a plurality of outlet paths connected to the expansion valves, respectively; and a valve assembly located at a refrigerant path from a condenser to the expansion valves for selectively controlling flow of a refrigerant from the condenser to the expansion valves and the corresponding outlet paths, wherein the valve assembly includes a valve chamber, wherein the refrigerant drawn from the condenser is held in the valve chamber; a plurality of outlet holes through which the refrigerant held in the valve chamber is discharged to the outlet paths, respectively; and a valve body for selectively opening and closing the outlet holes as the valve body rotates, such that the refrigerant held in the valve chamber is selectively discharged to the corresponding outlet paths.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DETAILED DESCRIPTION OF ILLUSTRATED EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 3:
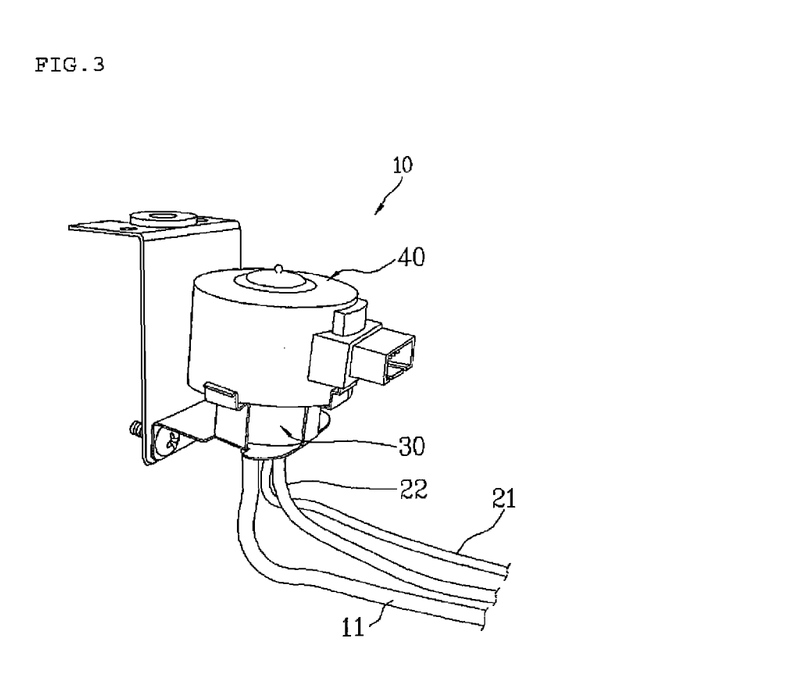
FIG. 3 is a perspective view illustrating an exterior of a valve assembly according to an embodiment of the present invention.
Figure 4:
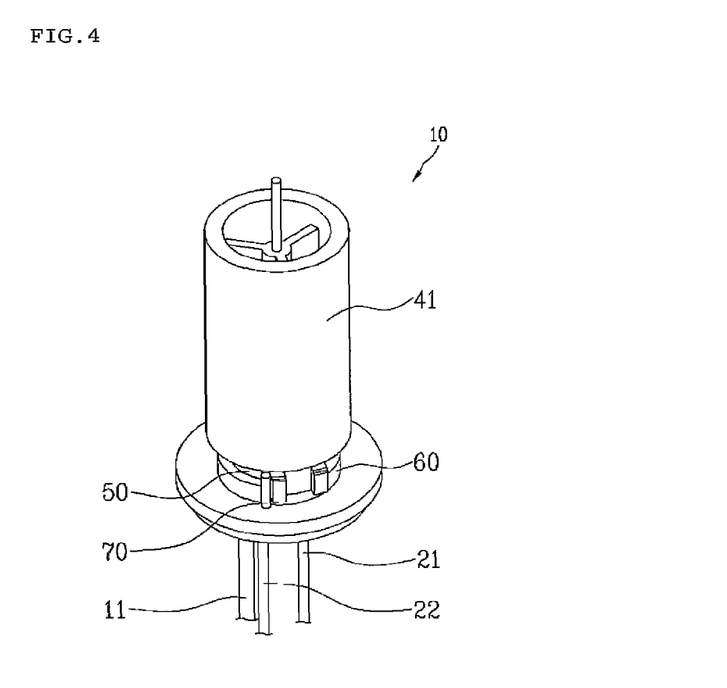
FIG. 4 is a perspective view illustrating a valve chamber provided in the valve assembly according to the embodiment of the present invention.
Figure 5:
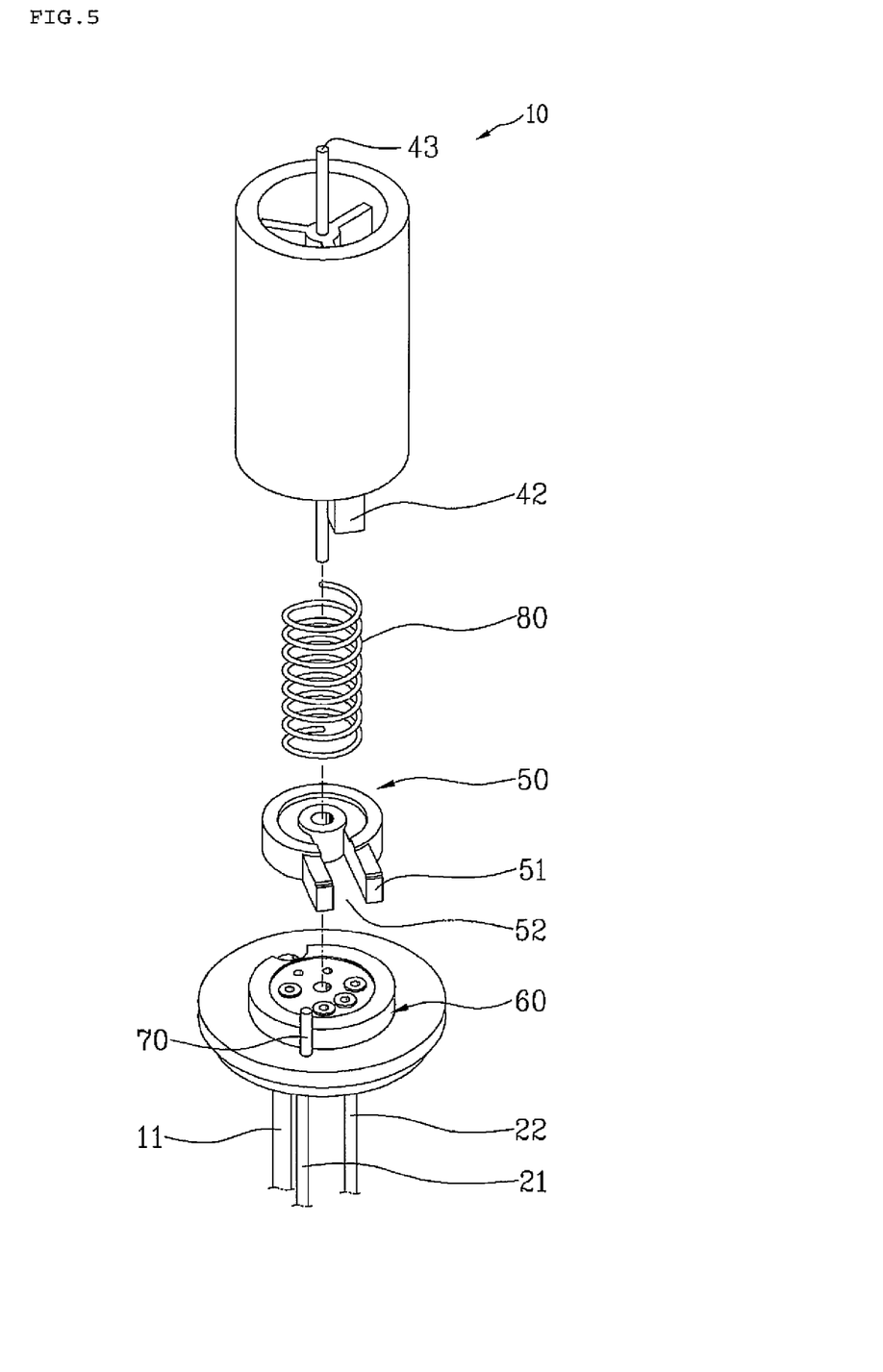
FIG. 5 is an exploded perspective view of FIG. 4.
Figure 6:
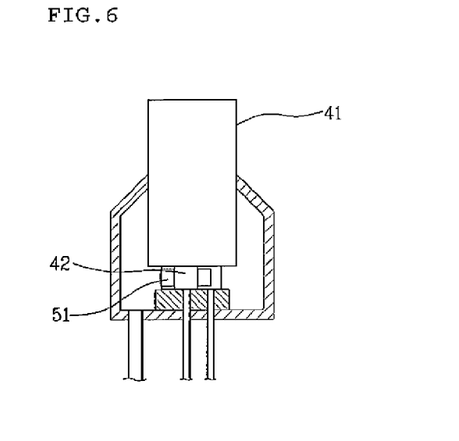
FIG. 6 is a diagram schematically illustrating a longitudinal section of FIG. 4.
Figure 7:
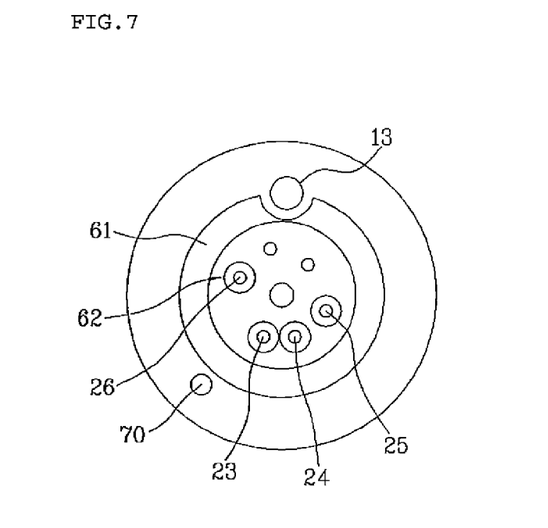
FIG. 7 is a plane view of a valve base provided in the valve assembly.
Figure 8:
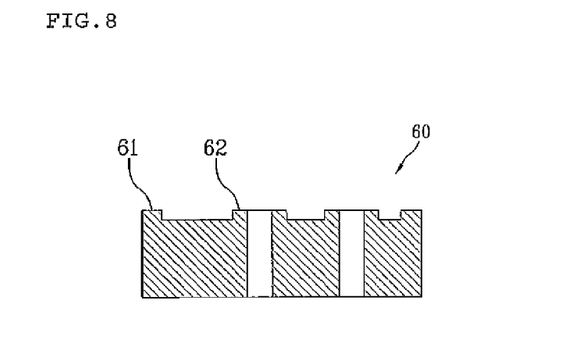
FIG. 8 is a sectional view of the valve base shown in FIG. 7.

FIG. 3 is a perspective view illustrating an exterior of a valve assembly according to an embodiment of the present invention. FIG. 4 is a perspective view illustrating a valve chamber provided in the valve assembly according to the embodiment of the present invention. FIG. 5 is an exploded perspective view of FIG. 4. FIG. 6 is a diagram schematically illustrating a longitudinal section of FIG. 4. FIG. 7 is a plane view of a valve base provided in the valve assembly. FIG. 8 is a sectional view of the valve base shown in FIG. 7.

In reference to FIGS. 3 to 8, the valve assembly 10 according to the embodiment of the present invention includes a valve chamber 30 provided at a path of refrigerant from a condenser 2 to an expansion valve 3 of a refrigerator. The valve chamber 30 forms an airtight space in which THE refrigerant is held.

The valve chamber 30 is connected to an inlet path 11 through which the refrigerant is drawn from the condenser 2, and two outlet paths 21 and 22 through which the refrigerant held in the valve chamber 30 is discharged.

The outlet paths 21 and 22 are refrigerant paths in which the refrigerant inside the valve chamber 30 flows to the expansion valve 3 and the evaporator 4. Here, the number of the outlet paths may be determined by the number of the expansion valves 3 and the evaporators 4. For example, if two evaporators are provided, two outlet paths 21 and 22 may be provided to allow the refrigerant to flow to the evaporators 4, respectively. Although this embodiment presents two evaporators 4 and two outlet paths 21 and 22, the present invention is not limited by this embodiment.

The valve assembly 10 includes a valve body 50 and a driving part 40. The valve body 50 is provided in the valve chamber 30 and it is rotatably in contact with a bottom of the valve chamber 30. The driving part 40 is mounted in the valve chamber 30 to drive the valve body 50. In an embodiment, the driving part 40 is a step motor.

As mentioned above, the valve assembly 10 having the above structure braches and supplies the refrigerant drawn from the condenser 2 to the expansion valve 3 and the evaporator 4.

Specifically, the driving part 40 of the valve assembly 10 rotates the valve body 50 to allow the refrigerant inside the valve chamber 30 to selectively flow in the first and second outlet paths 21 and 22. Hence, the flow path of refrigerant is branched and the refrigerant flows to the expansion valve 3 and the evaporator 4. There may be four combinations for the refrigerant to flow (1) only though the first outlet path 21, (2) only through the second outlet path 22, (3) through both of the first and second outlet path 21 and 22, or (3) neither through the first outlet path 21 nor the second outlet path 22. If more outlet paths are provided, there may be more combinations.

As shown in FIG. 7, the valve assembly 10 further includes an inlet hole 13, first outlet holes 23 and 25, and second outlet holes 24 and 26. The inlet hole 13 is connected to the inlet path 11. The first outlet holes 23 and 25 are connected to the first outlet path 21. The second outlet holes 24 and 26 are connected to the second outlet path 22.

As a result, the refrigerant drawn from the compressor 2 passes the inlet path 11 and the inlet hole 13 and is drawn into the valve chamber 30. The refrigerant held in the valve chamber 30 passes the first and second outlet holes 23, 24, 25 and 26, and the first and second outlet paths 21 and 22, and is drawn into the expansion valve 3 and the evaporator 4.

As it is rotated by the driving part 40, the valve body 50 selectively opens and closes the first and second outlet holes 23, 24, 25 and 26 to allow the refrigerant held in the valve chamber 30 to flow in the expansion valve 3 and the evaporator 4.

Furthermore, the valve assembly 10 may further include a valve base 60. In this case, the first and second outlet holes 23, 24, 25 and 26 are formed at the valve base 60. As the valve body 50 is rotated in contact with the valve base 60, the valve body 50 selectively opens and closes the first and second outlet holes 23, 24, 25 and 26.

More specifically, the valve body 50 is rotated on the valve base 60 by a rotor projection 42 of the driving part 40, which is a step motor, being engaged with a projection 51 of the valve body 50. A refrigerant in/out recess 52 is formed at the valve body 50. As shown in FIG. 6, a surface where the projection 51 of the valve body 50 is engaged with the rotor projection 42 is stepped in a predetermined height from the bottom of the valve body 50.

As a result, if the valve base 60 is provided, a predetermined aperture is formed at the valve base 60; if the valve base 60 is not provided (not shown), the predetermined aperture is formed at the bottom of the valve chamber 30. Hence, the refrigerant is flowing through the aperture and the refrigerant may be discharged to the first and second outlet holes 23, 24, 25 and 26 through the refrigerant in/out recess 52.

In addition, to stop supplying the refrigerant to the expansion valve 3 and the evaporator 4, that is, to close the first and second 23, 24, 25 and 26, the valve body 50 is rotated by the step motor 40 to position the refrigerant in/out recess 52 at a portion where the first and second outlet holes 23, 24, 25 and 26 are not formed.

In addition, to supply the refrigerant only to the operating one of the evaporators 4, the refrigerant in/out recess 52 is positioned at the first outlet holes 23 and 25 or the second outlet holes 24 and 26, such that the refrigerant passes through either one of the first outlet path 21 and the second outlet path 22.

In an embodiment, every two outlet holes formed in the valve chamber 30 are connected to a corresponding outlet path. Each one of every two outlet holes connected to each different outlet path is positioned closely together, to be exposed to the refrigerant in/out recess 52 of the valve body 50. The other ones of every two outlet holes are spaced apart in a predetermined distance, such that only one outlet hole is exposed to the refrigerant in/out recess 52.

For example, if the valve assembly 10 is a 3-way valve as shown in FIG. 7, the two first outlet holes 23 and 25 may be connected to the first outlet path 21 and the two second outlet holes 24 and 26 may be connected to the second outlet path 22. The outlet holes 23 and 24 connected to different outlet paths 21 and 22, respectively, are positioned closely each other to be exposed to the refrigerant in/out recess 52. The other outlet holes 25 and 26 are spaced apart in a predetermined distance, such that only one of the outlet holes 25 and 26 are exposed to the refrigerant in/out recess 52.

As a result, since the outlet holes 23 and 24 connected to the different outlet paths 21 and 22, respectively, are adjacent to each other and are both exposed to the refrigerant in/out recess 52, the refrigerant held in the valve chamber 30 is discharged through the first outlet path 21 and the second outlet path 22 such that the flow path of the refrigerant is branched and the refrigerant is supplied to both evaporators 4.

When either of the outlet holes 25 and 26 spaced apart in a predetermined distance is exposed to the refrigerant in/out recess 52 as the valve body 50 is rotated by the step motor 40, the refrigerant is discharged only through the first outlet path 21 or the second outlet path 22, and is supplied to only one of the evaporators 4. Here, the evaporator 4 that does not receive the refrigerant may perform a frost removal process.

In case that the compressor 1 is stopped, the outlet holes 23, 24, 25 and 26 are closed by the contact between the valve body 50 and the valve base 60. At this time, an elastic member 80 such as a spring may be provided on the valve body 50. If the elastic member 80 is provided, the valve body 50 may be in contact with the valve base 60 more closely by elasticity of the elastic member 80 and thus the valve body 50 may close the outlet holes 23, 24 25 and 26 airtight.

In addition, the valve assembly 10 may include a stopper 70 that prevents the projection 51 of the valve body 50, engaged with the rotor projection 42, from rotating further than one rotation. Whenever the valve body 50 rotates, the stopper 70 controls a zero point of the step motor 40.

According to the valve assembly described above, the valve body 50 is in contact with the valve base 60 to close the outlet holes 23, 24, 25 and 26 airtight. Since oil of the compressor 1 that is mixed with the refrigerant is drawn in the valve chamber 30 and the oil forms an oil film, the outlet holes 23, 24, 25 and 26 may be closed airtight efficiently.

However, the oil film between the valve body 50 and the valve base 60 might be broken. In case that plural outlet holes are provided, the possibility of the oil film being broken is getting higher. The outlet holes are not closed airtight and, when the compressor 1 is stopped, the refrigerant might be leaked from the condenser 2 to the expansion valve 3 and the evaporator 4, which might deteriorate efficiency of refrigerator cycle.

Next, a valve assembly according to another embodiment will be explained, which prevents an oil film formed between the valve body 50 and the valve base 60 from being damaged, to close the outlet holes airtight.

Figure 9:
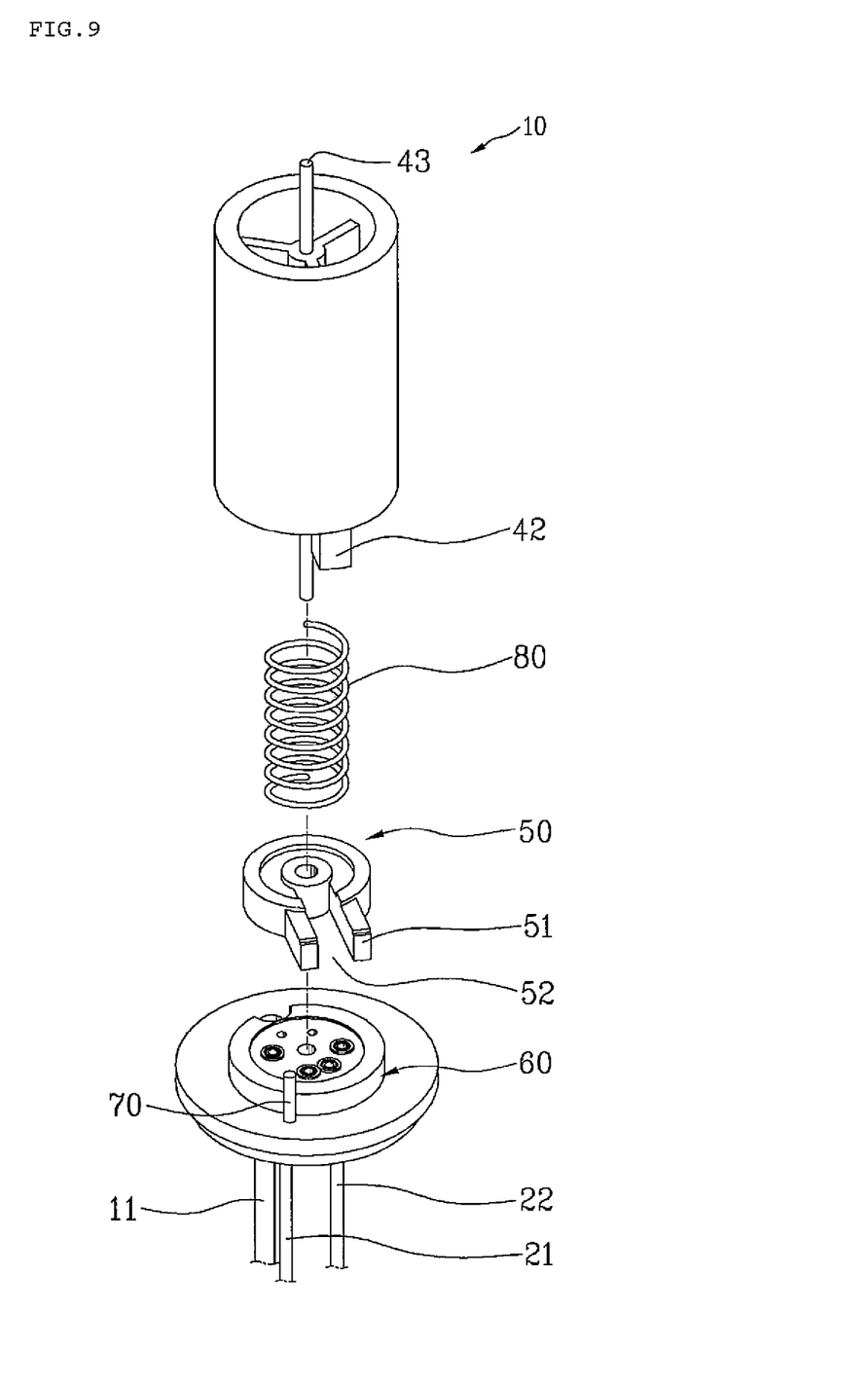
FIG. 9 is an exploded perspective view of a valve assembly according to another embodiment of the present invention.
Figure 10:
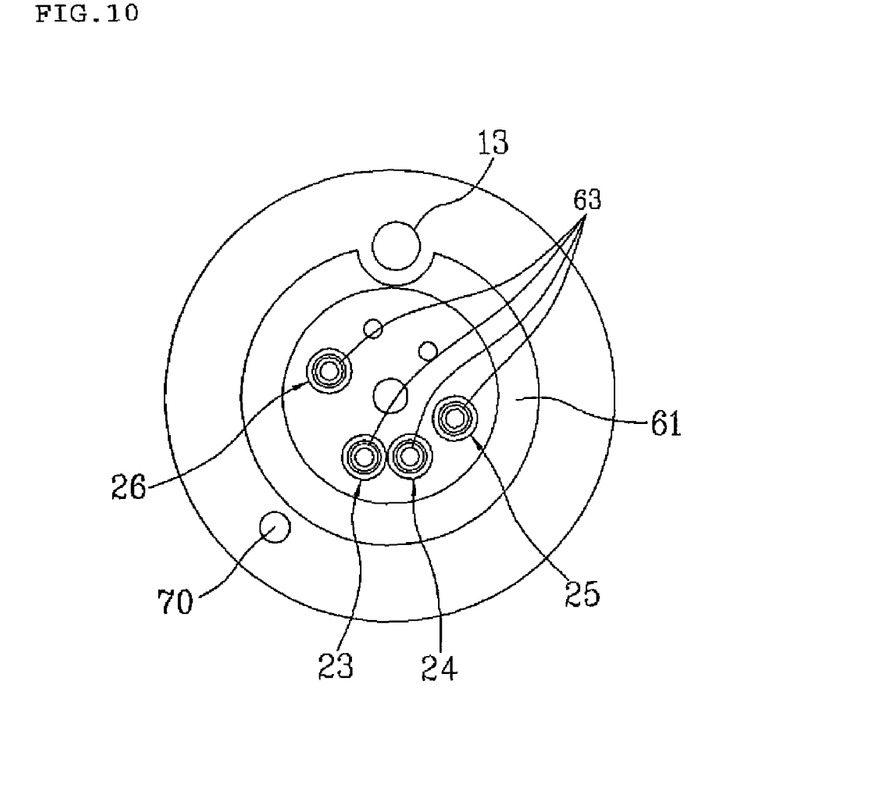
FIG. 10 is a plane view of a valve base provided in the valve assembly shown in FIG. 9.
Figure 11:
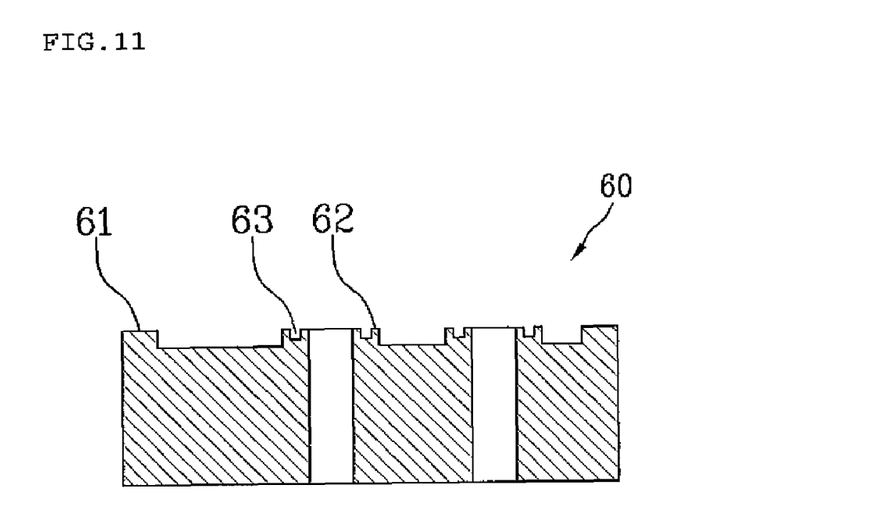
FIG. 11 is a sectional view of the valve base shown in FIG. 10.

FIG. 9 is an exploded perspective view of a valve assembly according to another embodiment of the present invention. FIG. 10 is a plane view of a valve base provided in the valve assembly shown in FIG. 9. FIG. 11 is a sectional view of the valve base shown in FIG. 10.

Compared with the above embodiment shown in FIGS. 3-8, the valve assembly according to another embodiment of the present invention further includes a holding part 63 formed near the outlet holes 23, 24, 25 and 26. Thus, the same components and description thereof are used as the ones of the above embodiment. In addition, the same reference numerals are used.

In reference to FIGS. 9 to 11, the valve assembly according to this embodiment may include the holding part 63. The holding part 63 holds a predetermined amount of oil and oil-seals a portion between the valve chamber 30 and the valve body 50. Here, the holding part 63 is provided on a bottom of the valve chamber 30 to allow the oil to oil-seal the portion between the bottom of the valve chamber 30 and the valve body 50. If the valve base 60 is provided, the holding part 63 may be formed on the valve base 60 to allow the oil to oil-seal the portion between the valve base 60 and the valve body 50.

In the illustrated embodiment, the holding part 63 may be a predetermined recess in which the oil can be held easily. In an embodiment, the holding part 63 is a closed channel for surrounding the outlet holes 23, 24, 25 and 26, respectively. Hence, the oil is sealed near the outlet holes 23, 24, 25 and 26 between the valve body 50 and the valve base 60, which can close the outlet holes 23, 24, 25 and 26 airtight.

As shown in FIG. 11, in the valve base 60, there are a protrusion 61 formed at an outer circumferential surface of the valve base 60 and a protrusion 62 formed near the outlet holes 23, 24, 25 and 26. The protrusions 61 and 62 are stepped and projected. The holding part 63 may be provided at the protrusion 62 formed near the outlet holes 23, 24, 25 and 26. If the valve base 60 is not provided in the valve assembly 10, the holding part 63 may be formed at the bottom of the valve chamber 30 as mentioned above.

As a result, according to the valve assembly 10 of this embodiment, oil may be held in the holding part 63 to prevent the oil film between the valve body 50 and the valve base 60 from being damaged, which enables the outlet holes closed airtight. That is, the oil is sealed between the valve body 50 and the valve base 60 by the holding part 63 to close the outlet holes airtight.

Figure 12:
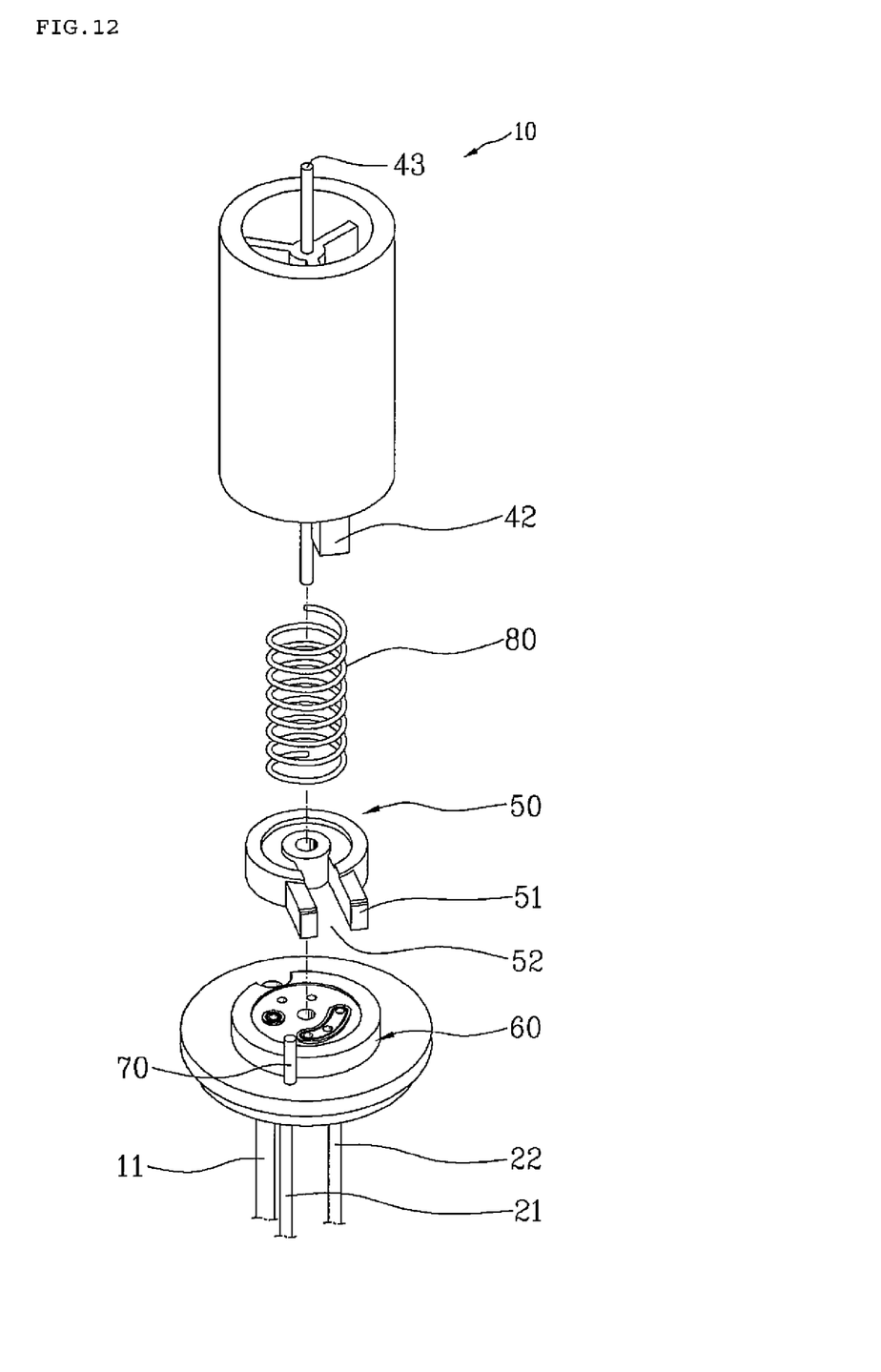
FIG. 12 is an exploded perspective view of a valve assembly according to a further embodiment of the present invention.
Figure 13:
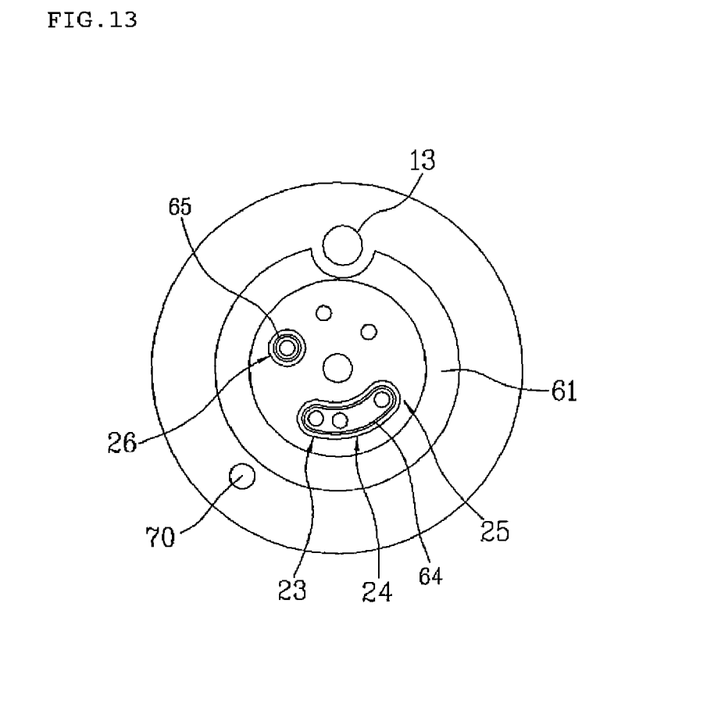
FIG. 13 is a plane view of the valve assembly shown in FIG. 12.

FIG. 12 is an exploded perspective view of a valve assembly a further embodiment of the present invention, and FIG. 13 is a plane view of the valve assembly shown in FIG. 12.

The valve assembly according to this embodiment has a different holding part, compared with the valve assembly according to the above embodiment shown in FIGS. 9-11. Thus, the description of the other components and their numeral references are the same and are used in this embodiment.

In reference to FIGS. 12 and 13, the holding part according to this embodiment includes a first holding part 64 and a second holding part 65. The first holding part 64 is a closed channel that surrounds an overall portion near three outlet holes 23, 24 and 25 positioned relatively adjacent to one another. The second holding part 65 surrounds one outlet hole 26 positioned relatively far from the other three outlet holes 23, 24 and 25. This embodiment has an advantageous effect that it is easy to fabricate the holding part.

The valve base 60 and the valve body 50 have small sizes. As a result, it is difficult to form the holding parts near the outlet holes 23, 24, 25 and 26, respectively, and the production cost may increase significantly.

If a holding part is a closed channel that surrounds plural outlet holes positioned adjacent to one another, it is easy to fabricate the holding part. In addition, as the amount of oil held in the holding part is getting large, the oil section in contact with the valve body 50 can be large and thus the outlet holes may still be closed airtight.

Figure 14:
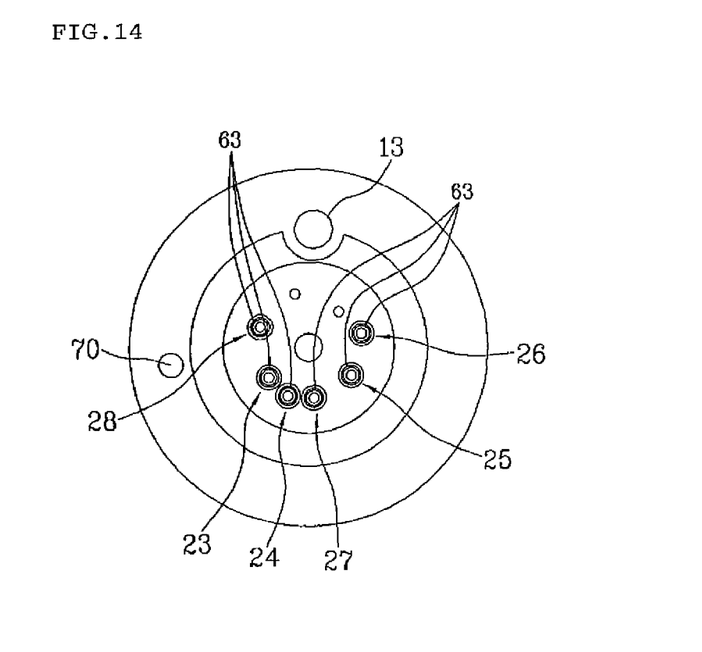
FIG. 14 is a plane view illustrating another embodiment of the valve base shown in FIG. 13.

FIG. 14 is a plane view illustrating another embodiment of the valve base shown in FIG. 13.

In reference to FIG. 14, the valve base 60 according to this embodiment has a different technical feature that an outlet hole in which the refrigerant inside the valve chamber 30 is discharged is further provided. That is, third outlet holes 27 and 28 are further provided at the valve base 60 according to this embodiment.

This embodiment presents a 4-way valve base 60. The refrigerator according to this embodiment includes one inlet path through which refrigerant is drawn from one condenser to the valve assembly and three outlet paths through which the refrigerant inside the valve assembly is supplied to three evaporators, respectively. The valve assembly according to this embodiment includes one inlet hole 13, first outlet holes 23 and 25, second outlet holes 24 and 26, and third outlet holes 27 and 28. The inlet hole 13 is connected to the inlet path. The two first, second third outlet holes are connected to the outlet paths, respectively.

Ones (i.e., the outlet holes 23, 24 and 27) of the two first outlet holes 23 and 25, second outlet holes 24 and 26, and the third outlet holes 27 and 28 may be adjacent to one another to be exposed to the refrigerant in/out recess 52. The other ones (i.e., the outlet 25, 26 and 28) of the first, second and third outlet holes are spaced apart in a predetermined distance, such that one or two of them may be exposed to the refrigerant in/out recess 52 at one time. In addition, when the compressor 1 is stopped, all of the outlet holes 23, 24, 25, 26, 27 and 28 may not be exposed to the refrigerant in/out recess 52 so that the refrigerant cannot be supplied to the evaporators at all. That is, all of the outlet holes are closed airtight.

If the outlet holes 23, 24 and 27 that are adjacent to one another are exposed to the refrigerant in/out recess 52, the refrigerant is supplied to the evaporators through the three outlet paths. Hence, when the valve body 50 is rotated to expose the outlet holes 23 and 24, the outlet holes 24 and 27, or the outlet holes 27 and 25 to the refrigerant in/out recess 52, the flow path of refrigerant is branched and the refrigerant is supplied to two evaporators through two outlet paths, respectively. When one of the outlet holes 25, 26 and 27 is exposed to the refrigerant in/out recess 52, the refrigerant is discharged and supplied to one evaporator through the corresponding outlet path. When none of the outlet holes 23, 24, 25 26, 27 and 28 are exposed to the refrigerant in/out recess 52, the refrigerant is not discharged through any of the outlet paths at all.

Figure 15:
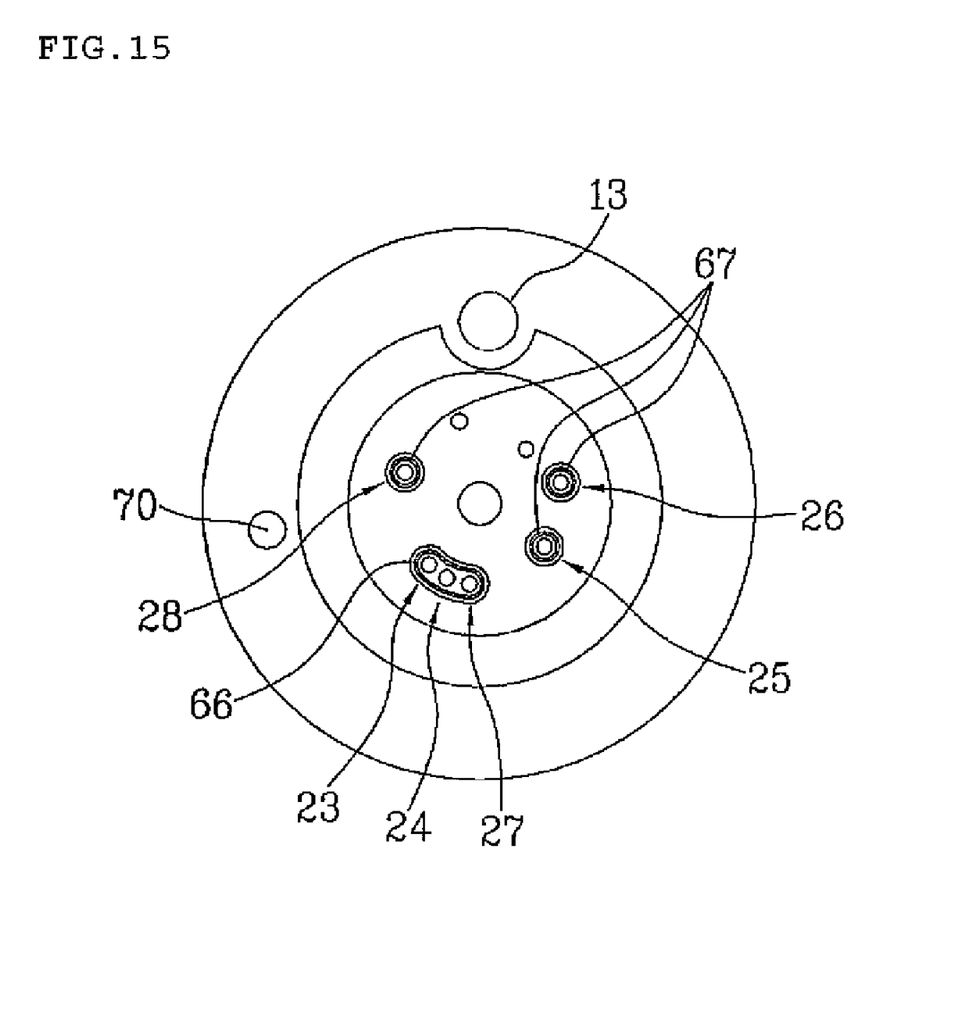
FIG. 15 is a plane view illustrating a further embodiment of the valve base shown in FIG. 13.

FIG. 15 is a plane view illustrating a further embodiment of the valve base shown in FIG. 13.

In reference to FIG. 15, the valve assembly according to this embodiment includes a first holding part 66 and a second holding part 67. The first holding part 66 is a closed channel that surrounds the outlet holes 23, 24 and 27 adjacent to one another at the valve base 60 shown in FIG. 14. The second holding parts 67 surround the outlet holes 25, 26 and 28, respectively, that are relatively spaced apart in a predetermined distance, compared to the other outlet holes.

As a result, it is easy to form the holding part at the valve base and thus it is easy to fabricate the valve base.

As shown in above, the refrigerant according to the illustrated embodiments has two or more than two evaporators 4. When the heater (not shown) is heated to remove frost of the evaporators 4, the valve assembly may be provided to prevent the refrigerant from flowing to the evaporators 4.

Furthermore, in case of the refrigerator in which more than two evaporators are installed in either of a refrigerator compartment and a freezer compartment to perform super cooling, the valve assembly according to the illustrated embodiments maybe applicable to control the refrigerant drawn into each evaporator 4.

According to the valve assembly of the illustrated embodiments, if the compressor is stopped, the refrigerant may be prevented from flowing to the evaporators.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The refrigerator described above has following advantageous effects.

First, the refrigerator including the valve assembly according to the illustrated embodiments can enhance the efficiency of a refrigerator cycle because the high temperature refrigerant of the condenser is drawn into the expansion valve and the evaporators when the compressor is stopped. Especially, in case of the valve assembly including the holding part, the oil (refrigerating apparatus oil) remaining in the holding part forms an oil film and thus oil-sealing is performed to close the outlet holes completely. As a result, when the compressor is stopped, all of the outlet holes provided in the valve may be closed airtight. Therefore loss caused by refrigerant leakage may be significantly reduced or prevented, which enhances the efficiency of a refrigerator cycle.

Furthermore, when the evaporators are selectively operated in the refrigerator including more than two evaporators, if a frost removal process is performed to remove frost of the evaporators, the refrigerant leakage to the non-operated evaporator is efficiently prevented during the frost removal process.

What is claimed is:

1. A refrigerator comprising:
a valve assembly located at a refrigerant path from a condenser to at least one expansion valve for controlling flow of a refrigerant from the condenser to the at least one expansion valve, the valve assembly comprising:
a valve chamber, wherein the refrigerant drawn from the condenser is held in the valve chamber;
at least one outlet hole through which the refrigerant held in the valve chamber is discharged to a corresponding outlet path connected to the at least one expansion valve;
a valve body for selectively opening and closing the at least one outlet hole as the valve body rotates, such that the refrigerant held in the valve chamber is selectively discharged to the corresponding outlet path;
a holding part recessed on a bottom of the valve chamber in the shape of a closed channel that surrounds the at least one outlet hole, in which a predetermined amount of oil for oil-sealing between the bottom of the valve chamber and the valve body is held; and
a valve base at which the at least one outlet hole and the holding part are fixedly formed, wherein the valve body selectively opens and closes the at least one outlet hole as the valve body rotates and is in contact with the valve base,
wherein the holding part is provided at a protrusion near the at least one outlet hole.

2. The refrigerator as claimed in claim 1, wherein the at least one outlet hole includes a plurality of outlet holes, and the holding part is a plurality of closed channels that surround the outlet holes, respectively.

3. The refrigerator as claimed in claim 1, wherein the at least one outlet hole includes a plurality of outlet holes, and the holding part comprises at least one closed channel surrounding at least two of the outlet holes immediately adjacent to each other.

4. The refrigerator as claimed in claim 1, wherein the valve assembly further comprises:

an elastic member applying an elastic force on the valve body toward the bottom of the valve chamber such that the valve body is in contact with the bottom of the valve chamber.

5. The refrigerator as claimed in claim 1, wherein a driving part for rotating the valve body is a motor rotatable in a clockwise and counter-clockwise direction.

6. The refrigerator as claimed in claim 5, wherein the motor is a step motor.

7. The refrigerator as claimed in claim 1, wherein the valve body is in contact with the bottom of the valve chamber.

8. The refrigerator as claimed in claim 1, further comprising:
a compressor for compressing the refrigerant and outputting the refrigerant to the condenser; and
at least one evaporator connected to the at least one expansion valve.

9. A refrigerator comprising:
a plurality of expansion valves and evaporators;
a plurality of outlet paths connected to the expansion valves, respectively; and
a valve assembly located at a refrigerant path from a condenser to the expansion valves for selectively controlling flow of a refrigerant from the condenser to the expansion valves and the corresponding outlet paths, wherein the valve assembly comprises:
a valve chamber, wherein the refrigerant drawn from the condenser is held in the valve chamber;
a plurality of outlet holes through which the refrigerant held in the valve chamber is discharged to the outlet paths, respectively;
a valve body for selectively opening and closing the outlet holes as the valve body rotates, such that the refrigerant held in the valve chamber is selectively discharged to the corresponding outlet paths;
a holding part recessed on a bottom of the valve chamber in the shape of a plurality of closed channels that surround the outlet holes, in which a predetermined amount of oil for oil-sealing between the bottom of the valve chamber and the valve body is held; and
a valve base at which the outlet holes and the holding part are fixedly formed, wherein the valve body selectively opens and closes the outlet holes as the valve body rotates and is in contact with the valve base,
wherein the holding part is provided at a protrusion near the outlet holes.

10. The refrigerator as claimed in claim 9, wherein the plurality of closed channels surround the outlet holes, respectively.

11. The refrigerator as claimed in claim 9, wherein each of the outlet paths is connected to a corresponding pair of the outlet holes, ones of the pairs of the outlet holes being adjacent to each other.

12. The refrigerator as claimed in claim 11, wherein one of the closed channels surrounds the ones of the pairs of the outlet holes.

13. The refrigerator as claimed in claim 11, wherein the valve body rotates to close the ones of the pairs of the outlet holes and open one of the other ones of the pairs of the outlet holes such that the refrigerant flows to only one of the outlet paths.

14. The refrigerator as claimed in claim 11, wherein the valve body rotates to simultaneously open the ones of the pairs of the outlet holes such that the refrigerant flows to the outlet paths via the ones of the pairs of the outlet holes, respectively.

15. The refrigerator as claimed in claim 9, wherein the valve body is in contact with the bottom of the valve chamber.

16. The refrigerator as claimed in claim 9, further comprising:
a compressor for compressing the refrigerant and outputting the refrigerant to the condenser,
wherein the evaporators are respectively connected to the expansion valves.

17. A refrigerator comprising: a valve assembly located at a refrigerant path from a condenser to at least one expansion valve for controlling flow of a refrigerant from the condenser to the at least one expansion valve, the valve assembly comprising: a valve chamber, wherein the refrigerant drawn from the condenser is held in the valve chamber; at least one outlet hole protruding from a bottom of the valve chamber; a valve body, wherein a part of a bottom surface of the valve body is in contact with the at least one outlet hole, and another part of the bottom surface of the valve body is in contact with the bottom of the valve chamber to form oil sealing; a holding part in which a predetermined amount of oil for oil-sealing between the bottom of the valve chamber and the valve body is held; and a valve base at which the at least one outlet hole and the holding part are fixedly formed, wherein the valve body selectively opens or closes the at least one outlet hole as the valve body rotates and is in contact with the valve base, wherein the holding part is provided at a protrusion near the at least one outlet hole.

18. The refrigerator as claimed in claim 17, the valve base comprising:
a wall formed at an outer circumferential surface of the valve base.

19. The refrigerator as claimed in claim 17, wherein the holding part is a recess.

20. The refrigerator as claimed in claim 19, wherein the holding part is a closed channel that surrounds the at least one outlet hole.

* * * * *